US008540406B2

(12) United States Patent
Stuesse et al.

(10) Patent No.: US 8,540,406 B2
(45) Date of Patent: Sep. 24, 2013

(54) SOLAR LIGHT BAR

(75) Inventors: Kyle C. Stuesse, St. Peters, MO (US); John C. Davis, Eureka, MO (US); Michael Lloyd, St. Louis, MO (US); Steve J. Herberholt, St. Louis, MO (US); Roger L. Miller, Crestwood, KY (US)

(73) Assignee: Code 3, Inc., St. Louis, MO (US)

( * ) Notice: Subject to any disclaimer, the term of this patent is extended or adjusted under 35 U.S.C. 154(b) by 217 days.

(21) Appl. No.: 13/212,602

(22) Filed: Aug. 18, 2011

(65) Prior Publication Data

US 2012/0049748 A1 Mar. 1, 2012

Related U.S. Application Data

(60) Provisional application No. 61/376,944, filed on Aug. 25, 2010.

(51) Int. Cl.

| | |
|---|---|
| ***B60Q 1/00*** | (2006.01) |
| ***B60Q 1/26*** | (2006.01) |
| ***B60Q 11/00*** | (2006.01) |
| ***B60Q 1/14*** | (2006.01) |
| ***H05B 37/00*** | (2006.01) |
| ***H05B 39/00*** | (2006.01) |

(52) U.S. Cl.

USPC ................ 362/493; 315/77; 315/80; 315/160

(58) Field of Classification Search

None

See application file for complete search history.

(56) References Cited

U.S. PATENT DOCUMENTS

| | | | | |
|---|---|---|---|---|
| 2002/0071268 | A1 | 6/2002 | Pederson | |
| 2007/0195939 | A1 | 8/2007 | Sink et al. | |
| 2012/0201041 | A1 * | 8/2012 | Gergets et al. | 362/493 |

OTHER PUBLICATIONS

PSE AMBER 420 Series Beacon Installation & Operation Manual, 12/24v Models Permanent and Magnetic LED and Strobe Beacons, (2009) 12 pages.

CODE 3 Installation & Operation Manual, LSS222 Dual Stacked Beacon, (2010) 8 pages.

* cited by examiner

*Primary Examiner* — Douglas W Owens

*Assistant Examiner* — Dedei K Hammond

(74) *Attorney, Agent, or Firm* — Senniger Powers LLP

(57) ABSTRACT

A solar light bar includes a battery isolator adapted to be connected between a bus and a vehicle charging system for isolating a vehicle battery from the bus and for selectively connecting the bus to the charging system. A light source switch connects the light source and the bus for selectively electrically connecting the light source to the bus. When the light source switch is closed, the light source is energized by electricity from at least one of the solar panel, the charging system and the auxiliary battery. When the light source switch is open, the light source is isolated from the bus. The auxiliary battery is adapted to be selectively charged by electricity from at least one of the solar panel and the charging system.

22 Claims, 10 Drawing Sheets

FUNCTIONAL BLOCK DIAGRAM

BLOCK DIAGRAM

FUNCTIONAL BLOCK DIAGRAM

IGNITION ON,
SWITCH ON
AND SOLAR PANEL
GENERATING

INGITION OFF,
SWITCH ON
AND SOLAR PANEL
GENERATING

IGNITION ON,
SWITCH OFF
AND SOLAR PANEL
GENERATING

IGNITION OFF,
SWITCH OFF
AND SOLAR PANEL
GENERATING

IGNITION ON
SWITCH ON
AND SOLAR PANEL
NOT GENERATING

IGNITION OFF
SWITCH ON
AND SOLAR PANEL
NOT GENERATING

IGNITION ON
SWITCH OFF
AND SOLAR PANEL
NOT GENERATING

SOLAR LIGHT BAR

BACKGROUND OF THE INVENTION

The present invention generally relates to light bars and other emergency warning lighting and, in particular, a light bar which is powered by solar energy.

SUMMARY OF THE INVENTION

In one form, the invention comprises a light bar for use with a vehicle including an ignition and a charging system connected to a vehicle battery. The light bar is for use with an auxiliary battery and comprises a light source, a bus, a solar panel, a battery isolator and a light source switch. The bus is electrically connected to the auxiliary battery for receiving electricity from the auxiliary battery. The solar panel is electrically connected to the bus for generating electricity and for providing generated electricity to the bus. The battery isolator is adapted to be connected between the bus and the charging system for isolating the vehicle battery from the bus and for selectively connecting the bus to the charging system such that the charging system when operating supplies electricity to the bus. The light source switch is connected to the light source and to the bus. The light source switch is responsive to an operator for selectively electrically connecting the light source to the bus. When the light source switch is closed, the light source is energized by electricity from at least one of the solar panel, the charging system and the auxiliary battery. When the light source switch is open the light source is isolated from the bus. The auxiliary battery is adapted to be selectively charged by electricity from at least one of the solar panel and the charging system.

In another form, the invention comprises a kit for use with an auxiliary battery and a light bar including a light source. The kit includes a solar panel adapted to be electrically connected to a bus connected the auxiliary battery, the solar panel for generating electricity and for providing generated electricity to the bus. The kit also includes a battery isolator adapted to be connected between the bus and the charging system for isolating the vehicle battery from the bus and for selectively connecting the bus to the charging system such that the charging system when operating supplies electricity to the bus. The kit also includes a light source switch adapted to be connected to the light source and to the bus, the light source switch responsive to an operator for selectively electrically connecting the light source to the bus. When the light source switch is closed, the light source is energized by electricity from at least one of the solar panel, the charging system and the auxiliary battery. When the light source switch is open, the light source is isolated from the bus. The auxiliary battery is adapted to be selectively charged by electricity from at least one of the solar panel and the charging system. The bus, which is adapted to be electrically connected to the auxiliary battery for receiving electricity from the auxiliary battery, may be an optional part of the kit.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1A:
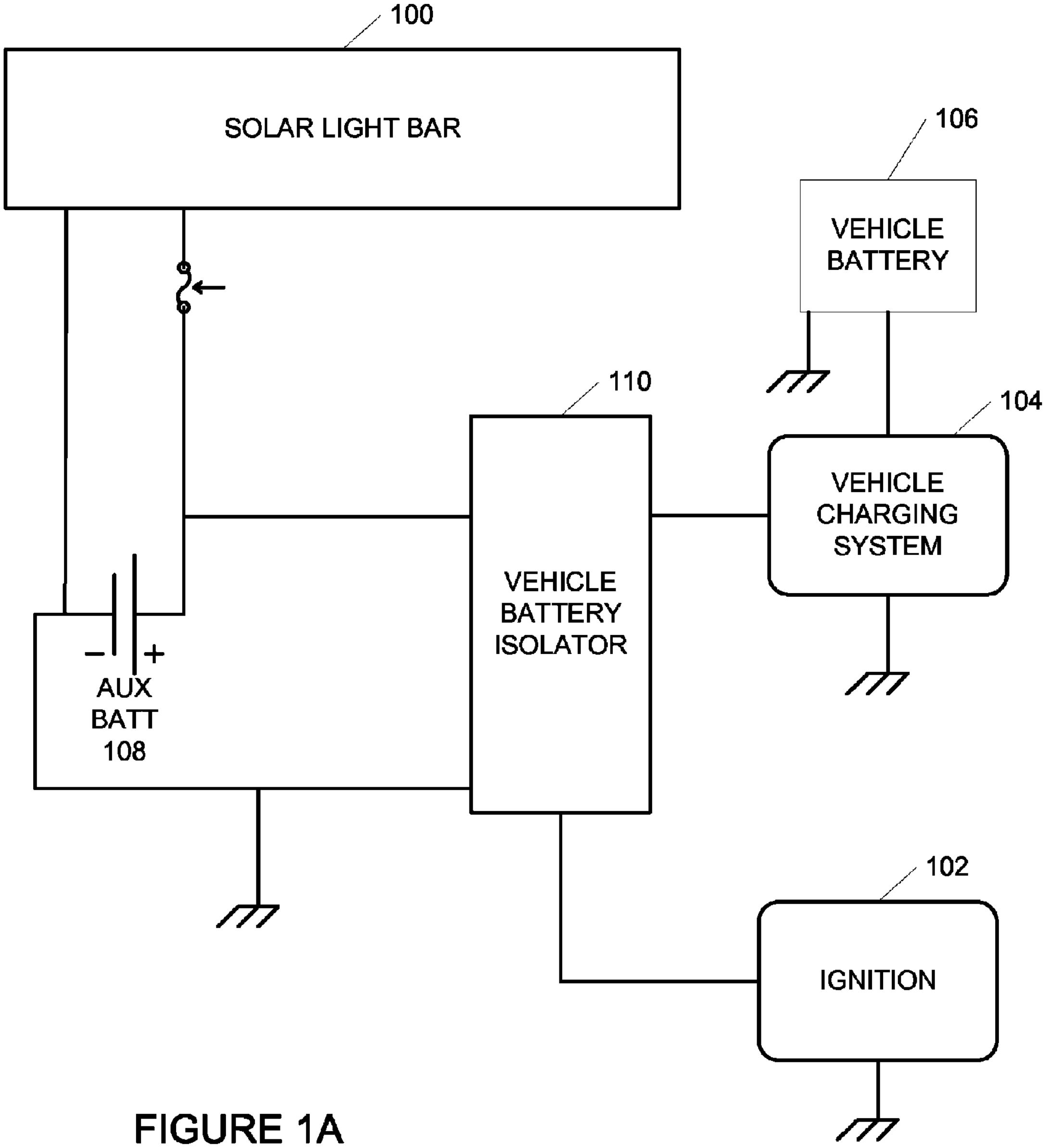
FIG. 1A is a block diagram of an embodiment of the invention in combination with a vehicle charging system, a vehicle battery and an ignition.

Referring to FIG. 1A, a block diagram of an embodiment of the invention in combination with a vehicle. In this embodiment, a light bar 100 is configured for use with a vehicle having an ignition 102 (e.g., an ignition switch and/or an ignition system) and a vehicle charging system 104 connected to a vehicle battery 106 for charging the battery 106 (e.g., an alternator system or a generator system). In this embodiment, the light bar 100 is configured for use with an auxiliary battery 108, such as a second vehicle battery or any other rechargeable battery integral with light bar 100 or separate from the light bar 100.

Figure 1B:
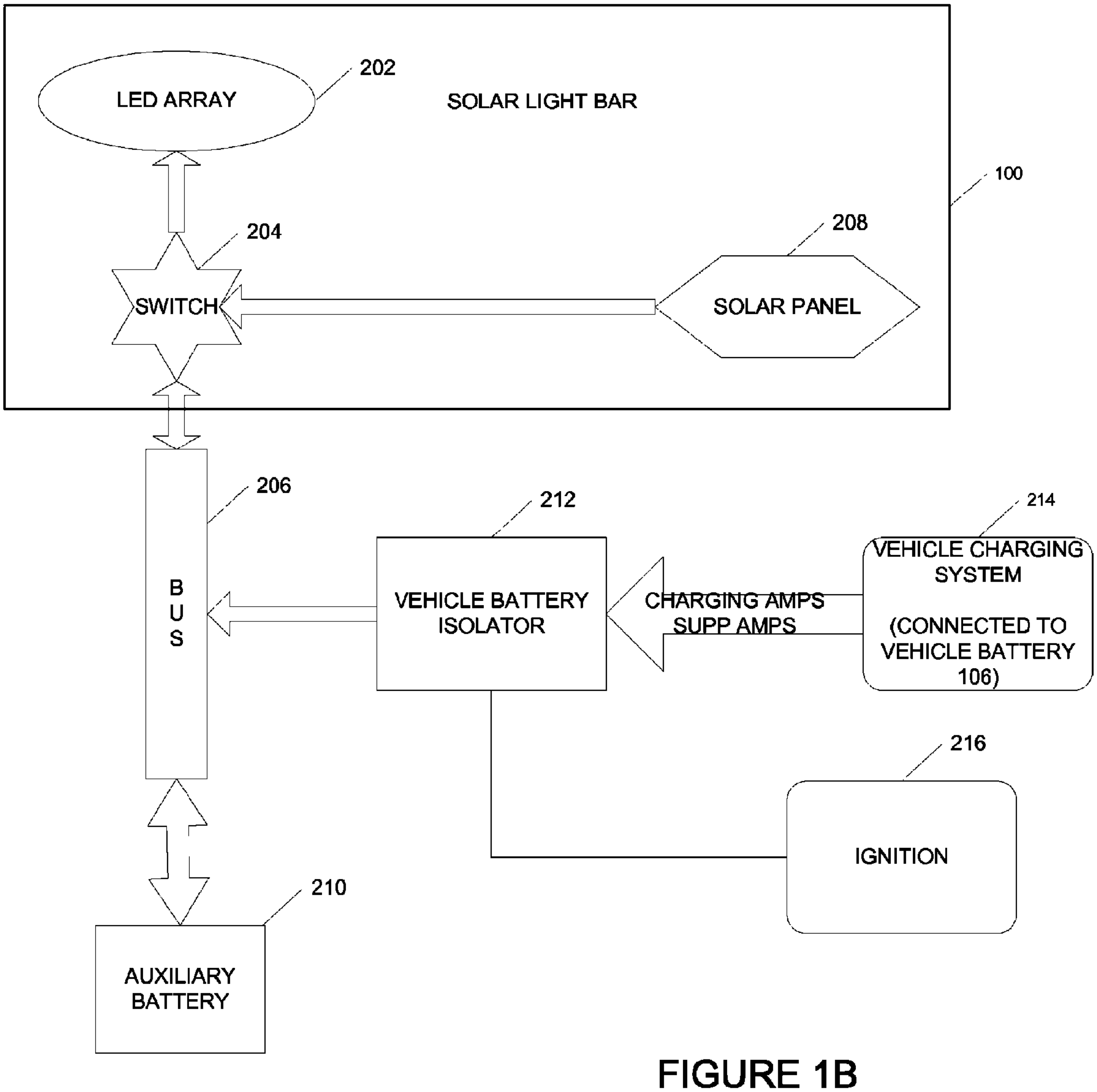
FIG. 1B is a function block diagram of the embodiment of FIG. 1A.

FIG. 1B is a function block diagram of the embodiment of FIG. 1A. As illustrated, the light bar 100 includes a light source such as an LED array 202, although any other light source commonly used for light bars and/or emergency lighting may be used, such an incandescent lamp, and HID lamp, a strobe lamp or other light producing element. The LED array may be one unit of two or more LEDs or it may be several units of one or more LEDs. A light source switch 204 is connected to the light source (e.g., the LED array 202) and is responsive to an operator for selectively electrically energizing the light source by connecting it to a bus 206. Although the switch 204 is illustrated as part of the light bar 100, it is contemplated that the switch 204 may be external to the light bar 100 and not a part thereof.

The light bar 100 also includes a solar panel 208 electrically connected to the bus 206 for generating direct current (DC) electricity (power) when illuminated and for providing generated electricity to the bus 206. It is contemplated that the solar panel 208 may be one or more panels including one or more solar cells which convert light to DC power.

In one form, the switch 204 is a single pole, single throw switch in series between the bus and the LED array 202 and the solar panel 208 is connected to the bus 206. In another form, the switch 204 is a multi-pole, multi-throw switch for selectively interconnecting the LED array 202, bus 206 and solar panel is 208.

The bus 206 is adapted to be electrically connected to the auxiliary battery 210 for receiving electricity (power) from the auxiliary battery 210 and for providing electricity (power) to the auxiliary battery 210. In one form, the bus 206 is a terminal strip which electrically interconnects the switch 204 and auxiliary battery 210 to a vehicle battery isolator 212.

The battery isolator 212 is adapted to be connected between the bus 206 and the vehicle charging system 214 for isolating the vehicle battery 106 from the bus 206 and for selectively connecting the bus 206 to the charging system 214 such that the charging system 214 when operating supplies electricity to the bus 206. One reason for isolating the vehicle battery 106 from the bus 206 is so that the auxiliary battery 210 and/or the LED array 202 do not draw any power from the vehicle battery 106. In this way, the light bar 100 and auxiliary battery 210 are electrically isolated and independent of the vehicle battery 106 and cannot draw down the vehicle battery 106 or otherwise cause it to lose power. Thus, the auxiliary battery 210 is adapted to be selectively charged by electricity (power) from at least one of the solar panel 208 and the charging system 214.

In one embodiment the battery isolator 212 is connected to and controlled by an ignition 216 of the vehicle. For example, the isolator 212 may be controlled by the ignition switch or any other portion of the ignition system which is only powered ON when the vehicle is operating. In one form, the battery isolator 212 is a single pole, single throw (SPST) solenoid switch controlled by the ignition switch so that the SPST switch is closed when the ignition is ON (energized) resulting in the vehicle charging system 214 being energized and electrically connected to the bus 206 to supply power to the bus 206. Thus, the vehicle battery isolator 212 comprises an isolation switch adapted to be connected to the ignition 216 and controlled by the ignition 216 such that when the ignition 216 is OFF the isolation switch is open-circuited and when the ignition 216 is ON the isolation switch is closed and electrically connects the charging system 214 to the bus 206. Alternatively, or in addition, the isolator 212 may be controlled and/or overridden by the operator.

The light source switch 204 is connected to the LED array 202 and to the bus 206. The light source switch 204 is responsive to an operator for selectively electrically connecting the LED array 202 to the bus 206. When the light source switch 204 is closed, the LED array 202 is energized by electricity (power) from at least one of the solar panel 208, the charging system 214 and the auxiliary battery 210. When the light source switch 204 is open, the LED array 202 is electrically isolated from the bus 202 and not energized.

In one embodiment, the solar panel 208 is configured to provide sufficient power to fully energize the array 202 when the panel 208 is fully illuminated. Thus, for example, when the panel 208 is in sunlight, the array 202 may operate without drawing any power from the auxiliary battery 210 and without needing any power from the charging system 214. In one embodiment, it is contemplated that the light source 202 draw up to 2 amperes of current when the light source switch 204 is closed and the light source 202 remains energized.

In one embodiment, the auxiliary battery 210 is configured to have sufficient amp-hours to energize the array 202 for a preset period of time, such as 12 hours, without the need for the auxiliary battery 210 to recharge from the charging system 214 and without the need for the array 202 to draw any supplemental power from the charging system 214.

According to various modes of operation of the invention, the ignition 216 may be ON or the ignition 216 may be OFF; the LED array 202 may be ON and illuminated and consuming power or the LED array 202 may be OFF and not illuminated and not consuming power; and the solar panel 208 may be illuminated and generating DC power or the solar panel 208 may not be sufficiently illuminated and not generating DC power. The following Table 1 identifies the various modes of operation the corresponding figure illustrates the particular mode. The various modes of operation depend upon whether the vehicle is operating causing the ignition 216 to be ON, whether the solar panel 208 is sufficiently illuminated causing it to generate power and/or whether the operator has closed the light source switch 204 causing the LED array 202 to be illuminated and drawing power via the bus from either or both of the vehicle charging system 214 and the auxiliary battery 210.

TABLE 1

| MODES OF OPERATION | | | | | | | | |
|---|---|---|---|---|---|---|---|---|
| FIGURE: | 2A | 2B | 2C | 2D | 3A | 3B | 3C | NONE |
| IGNITI0N 216 | ON | OFF | ON | OFF | ON | OFF | ON | OFF |
| LED ARRAY 202 | ON | ON | OFF | OFF | ON | ON | OFF | OFF |
| SOLAR PANEL 208 | ON | ON | ON | ON | OFF | OFF | OFF | OFF |

Figure 2A:
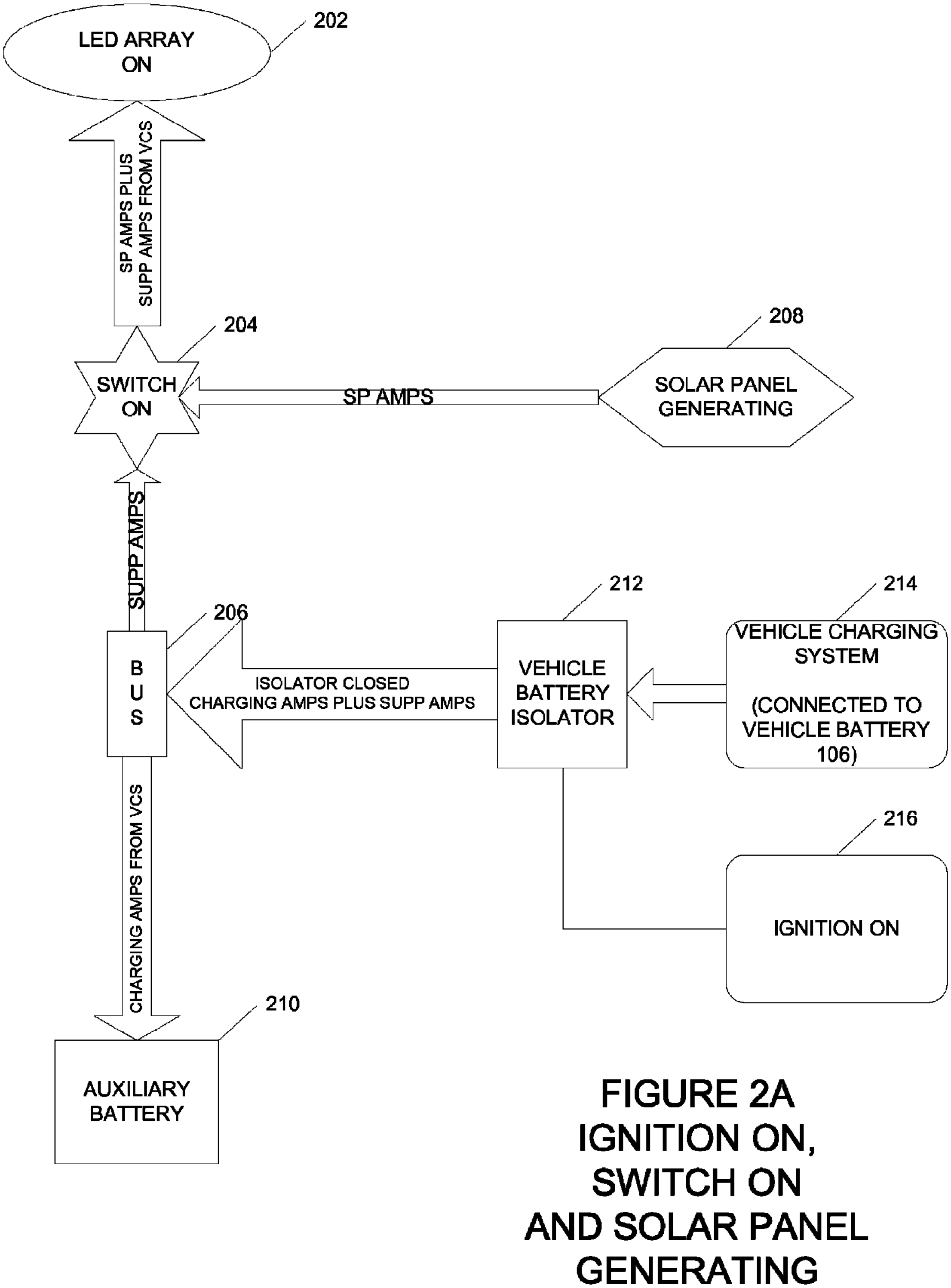
FIG. 2A illustrates FIG. 1B wherein the ignition is ON, the switch is ON and the solar panel is illuminated and generating electrical power.

FIG. 2A illustrates FIG. 1B in the mode wherein the ignition 216 is ON, the light source switch 204 is ON and the solar panel 208 is illuminated and generating electrical power. In this mode of operation, when the vehicle ignition 216 is ON and the light source switch 204 is closed and the solar panel 208 is generating electricity, then the LED array 202 is energized by the solar panel 208 and the vehicle charging system 214 and the auxiliary battery 210 is charged by the vehicle charging system 214. Since the solar panel 208 is illuminated to generate solar power (SP) amps and since the light source switch 204 has been closed by the operator (e.g., is ON), then the SP amps are provided via the closed switch 204 to the LED array 202 to illuminate the array. Since the ignition 216 is ON closing the isolator 212 (it is assumed that the vehicle charging system is properly operating and generating charging amps since the ignition is ON), the charging amps from the vehicle charging system (VCS) 214 are provided via the bus 206 to the auxiliary battery 210 and any supplemental amps needed to illuminate the LED array 202 are provided from the VCS 214 via the closed isolator 212, via the bus 206 and via the closed switch 204 to the array 202. Supplemental amps may be needed to fully illuminate in the array 202 if there is insufficient light to illuminate the panel 208 or if the panel 208 has been configured to have an output which is less than needed to fully energize array 202.

Figure 2B:
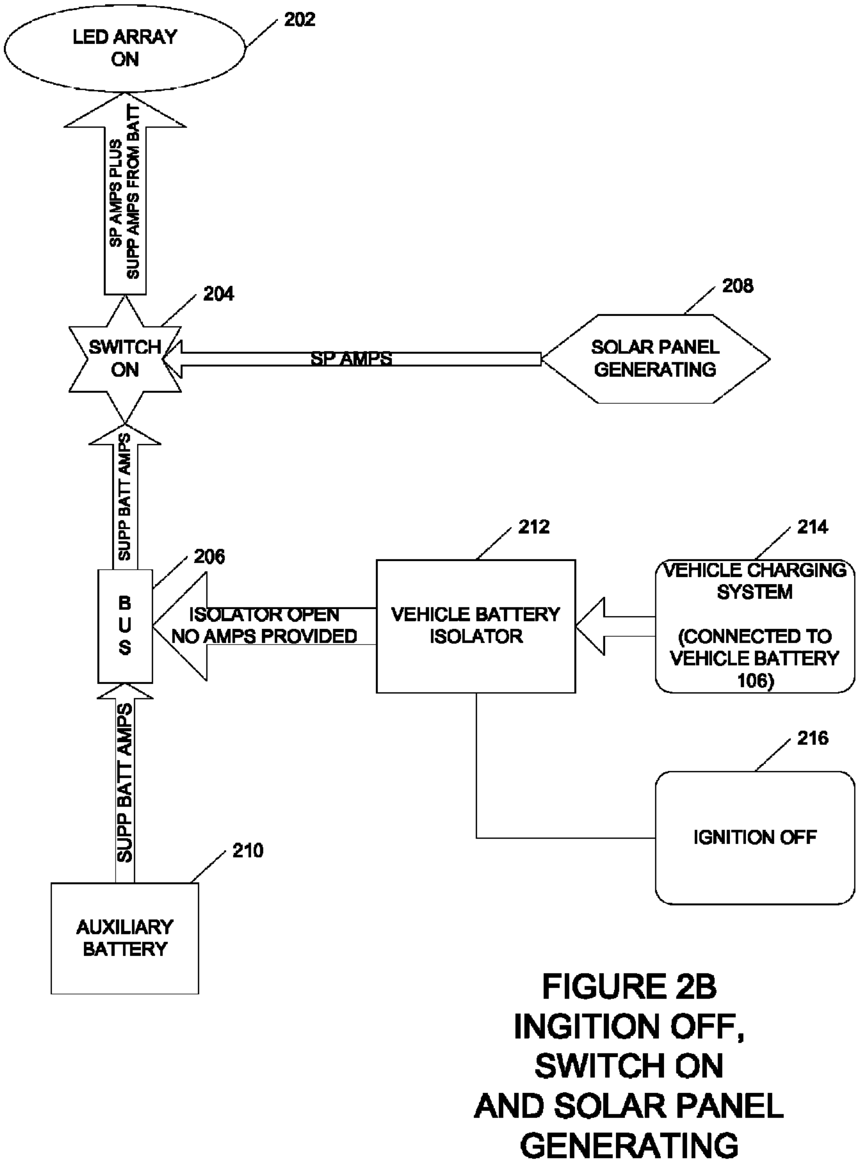
FIG. 2B illustrates FIG. 1B wherein the ignition is OFF, the switch is ON and the solar panel is illuminated and generating electrical power.

FIG. 2B illustrates FIG. 1B in the mode wherein the ignition 216 is OFF, the light source switch 204 is ON and the solar panel 208 is illuminated and generating electrical power. In this mode of operation, when the ignition 216 is OFF and the light source switch 204 is closed and the solar panel 208 is generating electricity, then the LED array 202 is energized by the solar panel 208 and the auxiliary battery 210. Since the solar panel 208 is illuminated to generate solar power (SP) amps and since the light source switch 204 has been closed by the operator (e.g., is ON), then the SP amps are provided via the closed switch 204 to the LED array 202 to illuminate the array. Since the ignition 216 is OFF opening the isolator 212 (it is assumed that the vehicle charging system is not operating and not generating charging amps since the ignition is OFF), no charging amps from the vehicle charging system (VCS) 214 are provided via the bus 206 to the auxiliary battery 210 and any supplemental amps needed to illuminate the LED array 202 are provided from the auxiliary battery 210.

Figure 2C:
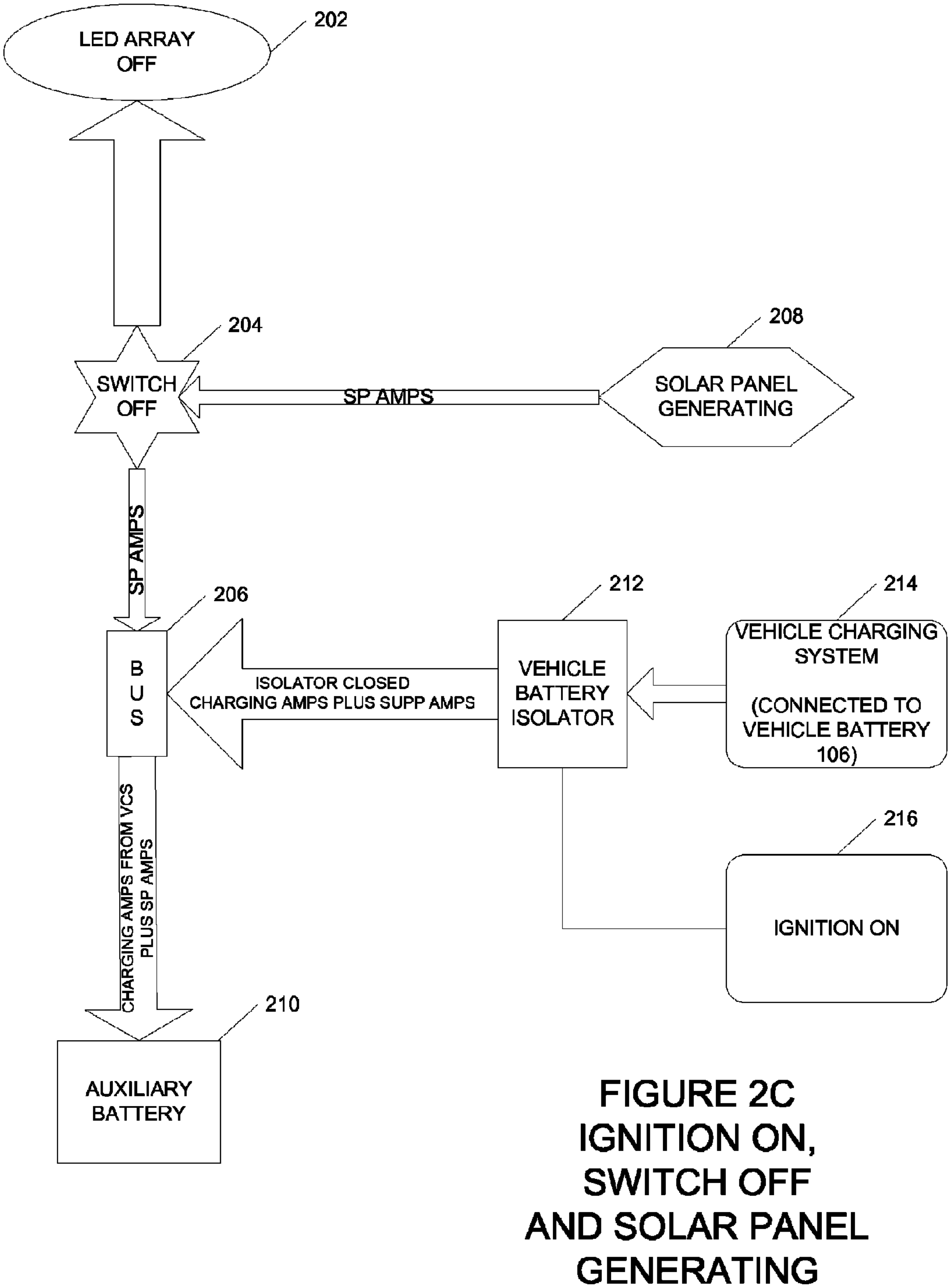
FIG. 2C illustrates FIG. 1B wherein the ignition is ON, the switch is OFF and the solar panel is illuminated and generating electrical power.

FIG. 2C illustrates FIG. 1B in the mode wherein the ignition 216 is ON, the light source switch 204 is OFF and the solar panel 208 is illuminated and generating electrical power. In this mode of operation, when the vehicle ignition 216 is ON and the light source switch 204 is open and the solar panel 208 is generating electricity, then the auxiliary battery 210 is charged by the solar panel 208 and the vehicle charging system 214. Since the solar panel 208 is illuminated to generate solar power (SP) amps and since the light source switch 204 has been opened by the operator (e.g., is OFF), then the SP amps are provided via the switch 204 to the auxiliary battery to charge the battery. Since the ignition 216 is ON closing the isolator 212 (it is assumed that the vehicle charging system is properly operating and generating charging amps since the ignition is ON), the charging amps from the vehicle charging system (VCS) 214 are provided via the bus 206 to the auxiliary battery 210.

Figure 2D:
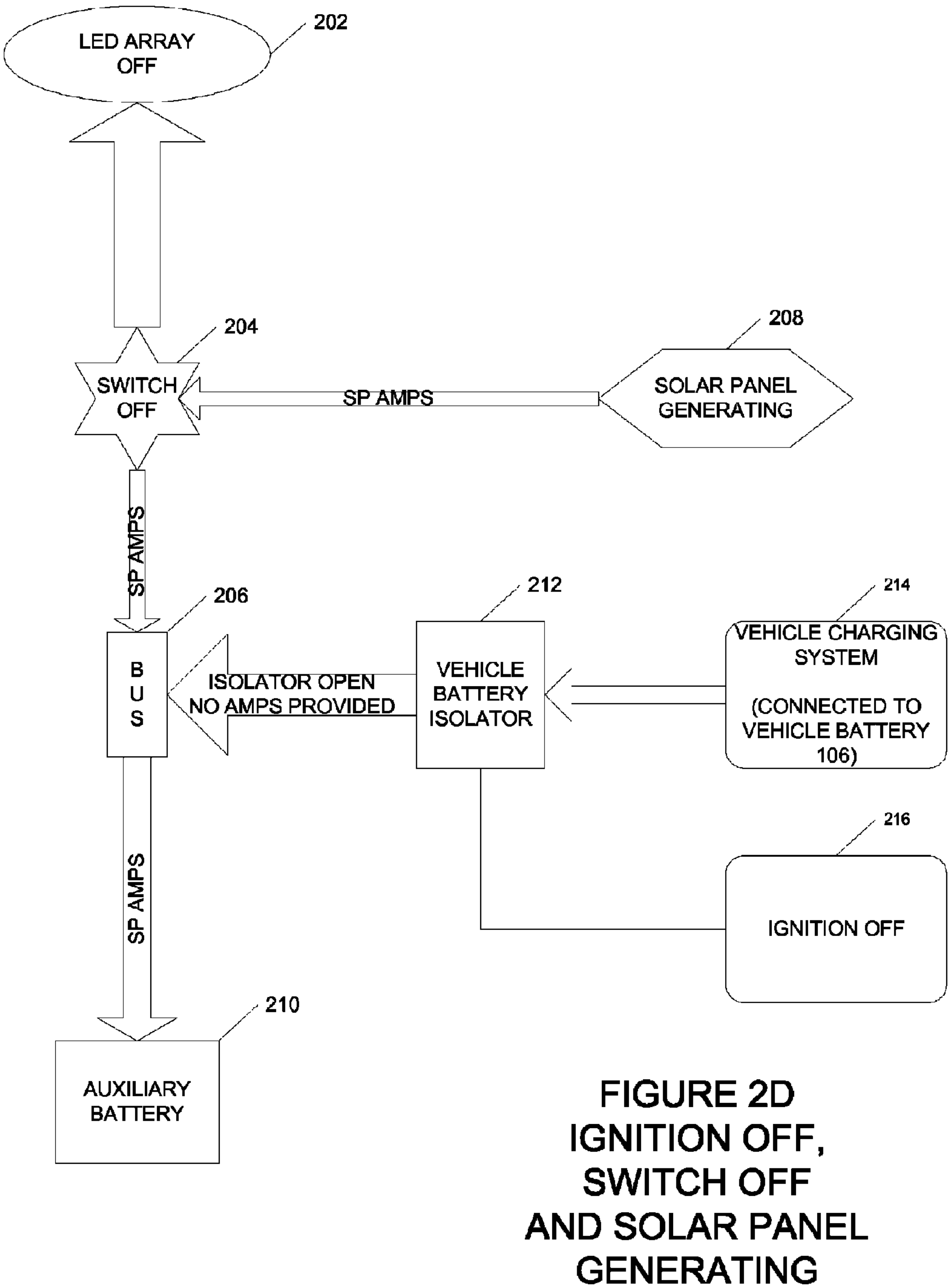
FIG. 2D illustrates FIG. 1B wherein the ignition is OFF, the switch is OFF and the solar panel is illuminated and generating electrical power.

FIG. 2D illustrates FIG. 1B in the mode wherein the ignition 216 is OFF, the light source switch 204 is OFF and the solar panel 208 is illuminated and generating electrical power. In this mode of operation, when the ignition 216 is OFF and the light source switch 204 is open and the solar panel 208 is generating electricity, then the auxiliary battery 210 is charged by the solar panel 208. Since the solar panel 208 is illuminated to generate solar power (SP) amps and since the light source switch 204 has been opened by the operator (e.g., is OFF), then the SP amps are provided via the switch 204 and via the bus 206 to charge the auxiliary battery 210. Since the ignition 216 is OFF opening the isolator 212 (it is assumed that the vehicle charging system is not operating and not generating charging amps since the ignition is OFF), no charging amps from the vehicle charging system (VCS) 214 are provided via the bus 206 to the auxiliary battery 210 or the LED array 202.

Figure 3A:
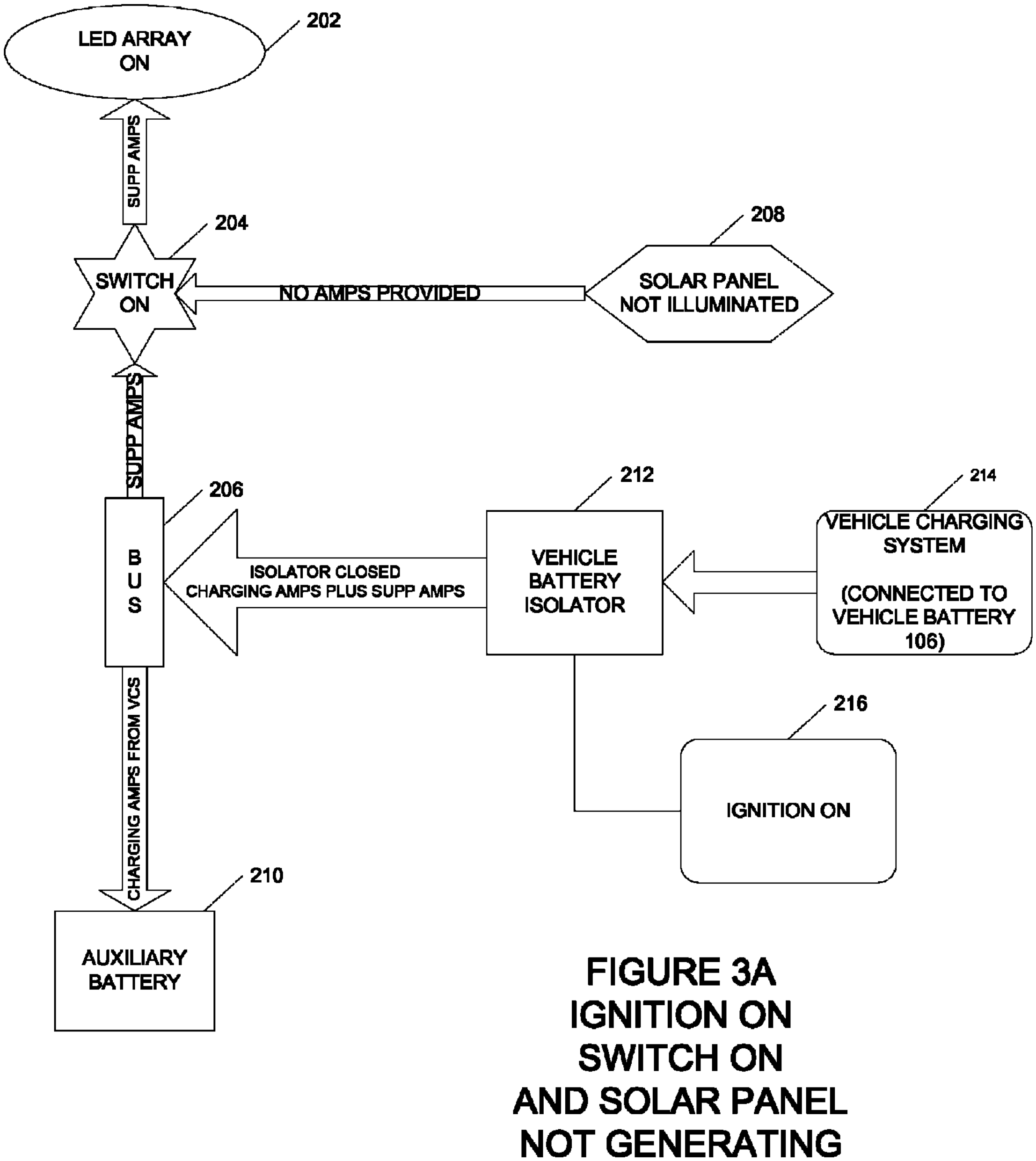
FIG. 3A illustrates FIG. 1B wherein the ignition is ON, the switch is ON and the solar panel is NOT illuminated and NOT generating electrical power.

FIG. 3A illustrates FIG. 1B in the mode wherein the ignition 216 is ON, the light source switch 204 is ON and the solar panel 208 is NOT illuminated and NOT generating electrical power. In this mode of operation, when the ignition 216 is ON and the light source switch 204 is closed and the solar panel 208 is not generating electricity, then the LED array 202 is energized by the vehicle charging system 214 and the auxiliary battery 210 is charged by the vehicle charging system 214. Since the solar panel 208 is not illuminated and not generating solar power (SP) amps and since the light source switch 204 has been closed by the operator (e.g., is ON), then no SP amps are provided via the closed switch 204 to the LED array 202. Since the ignition 216 is ON closing the isolator 212 (it is assumed that the vehicle charging system is properly operating and generating charging amps since the ignition is ON), the charging amps from the vehicle charging system (VCS) 214 are provided via the bus 206 to the auxiliary battery 210 and the supplemental amps needed to illuminate the LED array 202 are provided from the VCS 214 via the closed isolator 212, via the bus 206 and via the closed switch 204 to the array 202. In this mode, the supplemental amps provided from the VCS 214 to the array 210 equal the amps needed to power the LED array 202.

Figure 3B:
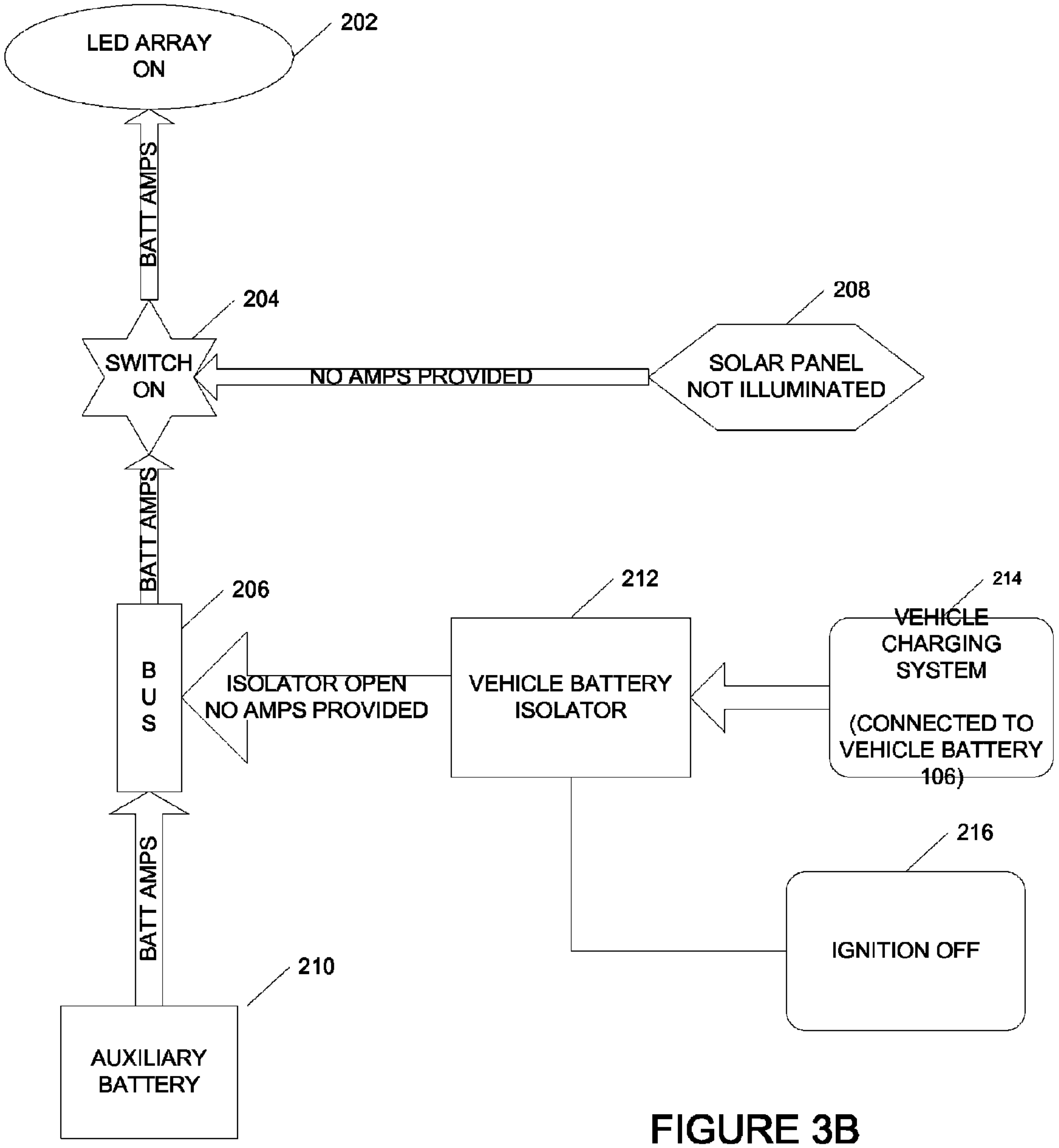
FIG. 3B illustrates FIG. 1B wherein the ignition is OFF, the switch is ON and the solar panel is NOT illuminated and NOT generating electrical power.

FIG. 3B illustrates FIG. 1B in the mode wherein the ignition 216 is OFF, the light source switch 204 is ON and the solar panel 208 is NOT illuminated and NOT generating electrical power. In this mode of operation, when the vehicle ignition 216 is OFF and the light source switch 204 is closed and the solar panel 208 is not generating electricity, then the LED array 202 is energized by the auxiliary battery 210. Since the solar panel 208 is not illuminated and not generating solar power (SP) amps and since the light source switch 204 has been closed by the operator (e.g., is ON), then no SP amps are provided via the closed switch 204 to the LED array 202. Since the ignition 216 is OFF opening the isolator 212 (it is assumed that the vehicle charging system is not operating and not generating charging amps since the ignition is OFF), no charging amps from the vehicle charging system (VCS) 214 are provided to the bus 206. The auxiliary battery 210 provides amps via the bus 206, via the switch 204 to energize the array 202. In this mode, the amps provided to the array 201 from the battery 210 equal the amps needed to power the LED array 202.

Figure 3C:
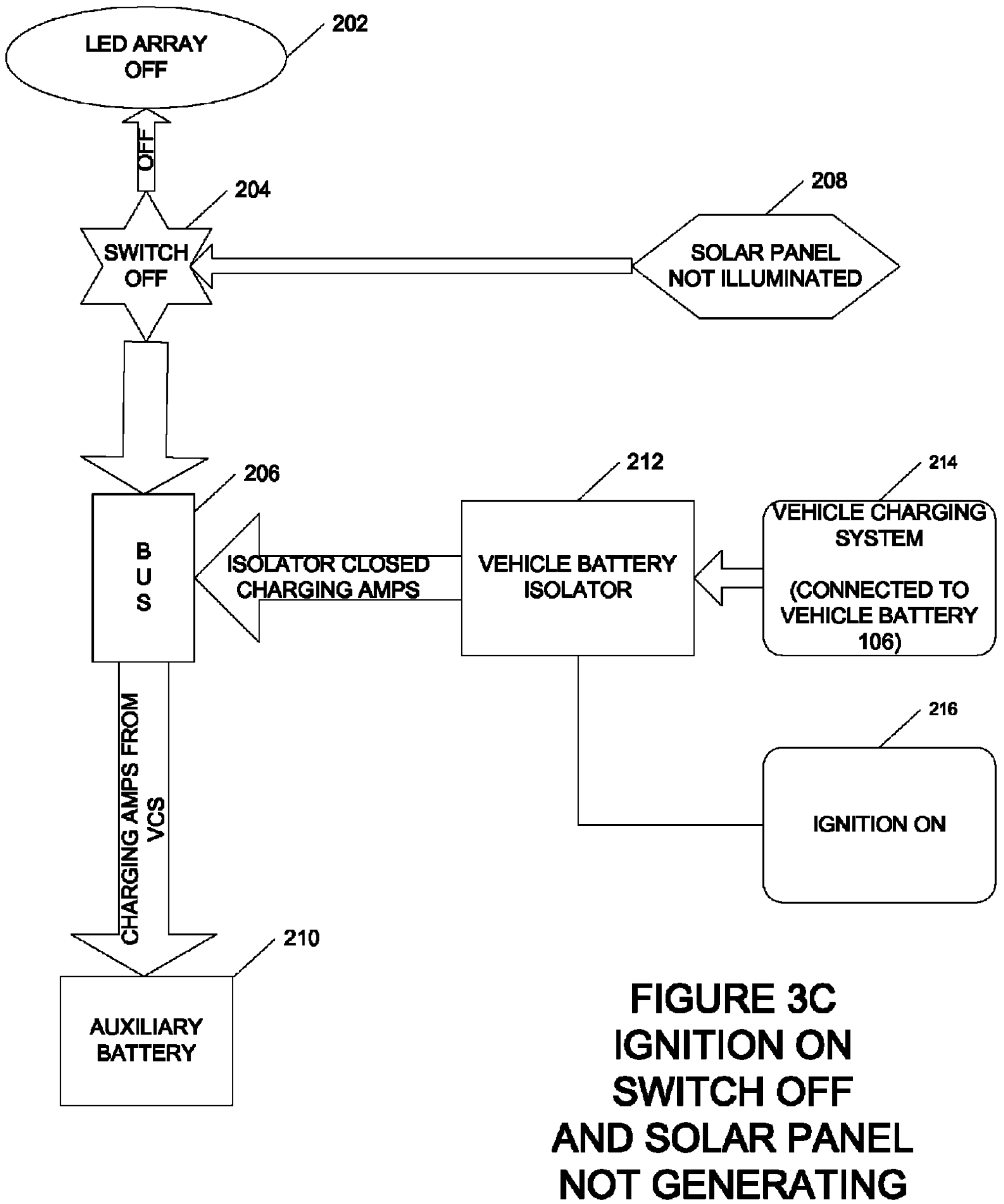
FIG. 3C illustrates FIG. 1B wherein the ignition is ON, the switch is OFF and the solar panel is NOT illuminated and NOT generating electrical power.

FIG. 3C illustrates FIG. 1B in the mode wherein the ignition 216 is ON, the light source switch 204 is OFF and the solar panel 208 is NOT illuminated and NOT generating electrical power. In this mode of operation, when the vehicle ignition 216 is ON and the light source switch 204 is open and the solar panel 208 is not generating electricity, then the auxiliary battery 210 is charged by the vehicle charging system 214. Since the solar panel 208 is not illuminated and not generating solar power (SP) amps and since the light source switch 204 has been opened by the operator (e.g., is OFF), then no SP amps are provided to the LED array 202. Since the ignition 216 is ON closing the isolator 212 (it is assumed that the vehicle charging system is properly operating and is generating charging amps since the ignition is ON), the charging amps from the vehicle charging system (VCS) 214 are provided via the bus 206 to charge The auxiliary battery 210.

Figure 4:
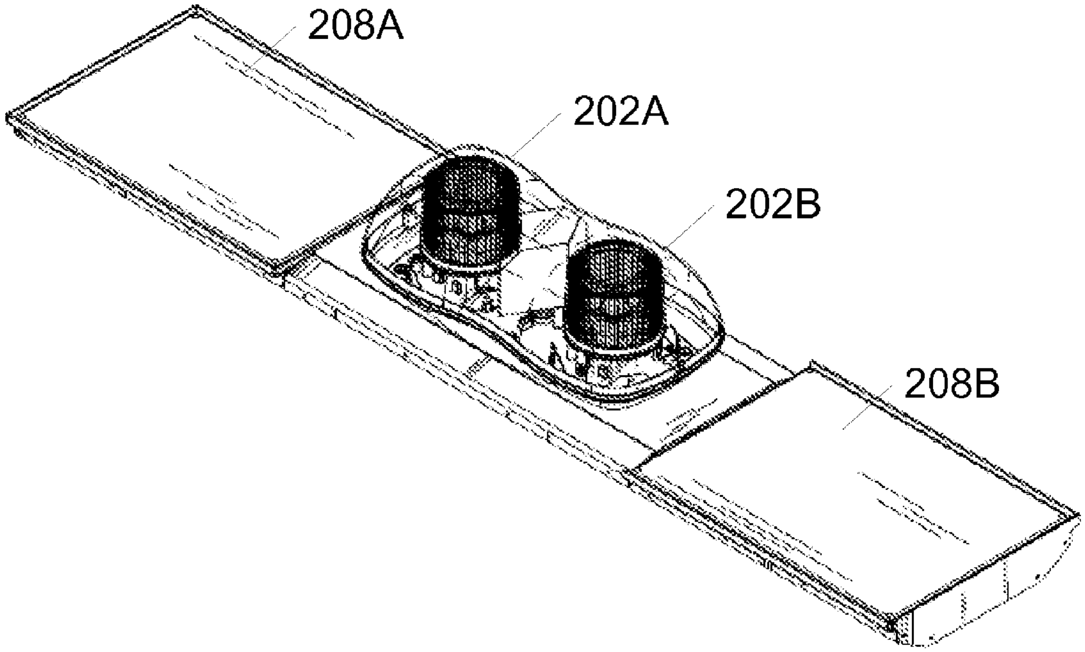
FIG. 4 is a perspective view of one embodiment of the solar light bar of the invention.

As shown in perspective in FIG. 4, the light bar 100 comprises a first solar panel 208A mounted on one side of one LED array 202A and a second solar panel 208B mounted on the other side of another LED array 202B. As noted above, it is contemplated that the light source 202 draw up to 2 amperes of current when the light source switch 204 is closed and the light source 202 remains energized. In the light bar 100 shown in FIG. 4, each panel 208A, 208B generates about 1 amp when illuminated and the light bar 100 is configured in size to fit a passenger vehicle, such as a vehicle used by police. In the light bar 100 shown in FIG. 4, each array 202A, 202B may be a Model LSS222 Dual Stacked Beacon, manufactured and sold by Code 3, Inc., the assignee. The LSS222 is a weatherproof LED based warning light beacon that contains 16 state-of-the-art high intensity LED's in two stacked rows. The reflector's design captures the light of the LED's with individual parabolas that efficiently collect the light and broadcast it through the fresnelled lens.

It is also contemplated that in one embodiment, the invention comprises a kit for retrofit to an existing light bar. In particular, the kit would be for use with an auxiliary battery 210 and a light bar, such as any LED light bar, including a light source 202. In this embodiment, the kit has a solar panel 208 adapted to be electrically connected to a bus 206 (not necessarily provided with the kit). The bus 206 would be connected to the auxiliary battery 210. The solar panel 208 is for generating electricity and for providing generated electricity to the light bar via the bus 206. The kit also has a battery isolator adapted to be connected between the bus 206 and a charging system 214 of a vehicle for isolating a vehicle battery 106 from the bus 206 and for selectively connecting the bus 206 to the charging system 214 such that the charging system 214 when operating supplies electricity to the bus 206. The kit has a light source switch 204 adapted to be connected to the light source 202 and to the bus 206, the light source switch 204 responsive to an operator for selectively electrically connecting the light source 202 to the bus 206 wherein when the light source switch 204 is closed, the light source 202 is energized by electricity from at least one of the solar panel 208, the charging system 214 and the auxiliary battery 210, and wherein when the light source switch 204 is open the light source 202 is isolated from the bus 206. Thus, the kit permits the auxiliary battery 210 to be selectively charged by electricity from at least one of the solar panel 208 and the charging system 214.

In another embodiment, the kit may include the bus 206 adapted to be electrically connected to the auxiliary battery 210 for receiving electricity from the auxiliary battery 210.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "the" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A light bar for use with a vehicle including an ignition and a charging system connected to a vehicle battery, said light bar for use with an auxiliary battery, said light bar comprising:

a light source;

a bus adapted to be electrically connected to the auxiliary battery for receiving electricity from the auxiliary battery and for providing electricity to the auxiliary battery;

a solar panel electrically connected to the bus for generating electricity and for providing generated electricity to the bus;

a battery isolator adapted to be connected between the bus and the charging system for isolating the vehicle battery from the bus, said battery isolator responsive to the ignition for selectively connecting the bus to the charging system such that the charging system when operating supplies electricity to the bus;

a light source switch connected to the light source and to the bus, said light source switch responsive to an operator for selectively electrically connecting the light source to the bus;

wherein when the light source switch is closed-circuited, the light source is energized by electricity from at least one of the solar panel, the charging system and the auxiliary battery;

wherein when the light source switch is open, the light source is isolated from the bus; and wherein the auxiliary battery is adapted to be selectively charged by electricity from at least one of the solar panel and the charging system.

2. The light bar of claim 1 wherein the battery isolator comprises an isolation switch adapted to be connected to an ignition of the vehicle and controlled by the ignition such that when the ignition is OFF the isolation switch is open-circuited and when the ignition is ON the isolation switch is closed-circuited and electrically connects the charging system to the bus.

3. The light bar of claim 2, wherein when the vehicle ignition is ON and the light source switch is closed-circuited and the solar panel is generating electricity, then the light source is energized by the solar panel and the vehicle charging system and the auxiliary battery is charged by the vehicle charging system.

4. The light bar of claim 2, wherein when the ignition is OFF and the light source switch is closed-circuited and the solar panel is generating electricity, then the light source is energized by the solar panel and the auxiliary battery.

5. The light bar of claim 2, wherein when the vehicle ignition is ON and the light source switch is open and the solar panel is generating electricity, then the auxiliary battery is charged by the solar panel and the vehicle charging system.

6. The light bar of claim 2, wherein when the ignition is OFF and the light source switch is open and the solar panel is generating electricity, then the auxiliary battery is charged by the solar panel.

7. The light bar of claim 2, wherein when the ignition is ON and the light source switch is closed-circuited and the solar panel is not generating electricity, then the light source is energized by the vehicle charging system and the auxiliary battery is charged by the vehicle charging system.

8. The light bar of claim 2, wherein when the vehicle ignition is OFF and the light source switch is closed-circuited and the solar panel is not generating electricity, then the light source is energized by the auxiliary battery.

9. The light bar of claim 2, wherein when the vehicle ignition is ON and the light source switch is open and the solar panel is not generating electricity, then the auxiliary battery is charged by the vehicle charging system.

10. The light bar of claim 1, wherein the light source is a light emitting diode (LED).

11. The light bar of claim 1, wherein the solar panel comprises a first solar panel mounted on one side of the light source and a second solar panel mounted on the other side of the light source.

12. The light bar of claim 1, wherein the light source draws up to 2 amperes of current when the light source switch is closed-circuited and the light source remains energized.

13. A kit for use with an auxiliary battery and a light bar including a light source, said kit comprising:

a solar panel adapted to be electrically connected to a bus connected to the auxiliary battery, said solar panel for generating electricity and for providing generated electricity to the bus;

a battery isolator adapted to be connected between the bus and a charging system of a vehicle for isolating a vehicle battery from the bus, said battery isolator responsive to the ignition for selectively connecting the bus to the charging system such that the charging system when operating supplies electricity to the bus;

a light source switch adapted to be connected to the light source and to the bus, said light source switch responsive to an operator for selectively electrically connecting the light source to the bus;

wherein when the light source switch is closed-circuited, the light source is energized by electricity from at least one of the solar panel, the charging system and the auxiliary battery;

wherein when the light source switch is open, the light source is isolated from the bus; and wherein the auxiliary battery is adapted to be selectively charged by electricity from at least one of the solar panel and the charging system.

14. The light bar of claim 13, wherein the battery isolator comprises an isolation switch adapted to be connected to an ignition and controlled by the ignition such that when the ignition is OFF the isolation switch is open-circuited and when the ignition is ON the isolation switch is closed-circuited and electrically connects the charging system to the bus.

15. The light bar of claim 14, wherein when the vehicle ignition is ON and the light source switch is closed-circuited and the solar panel is generating electricity, then the light source is energized by the solar panel and the vehicle charging system and the auxiliary battery is charged by the vehicle charging system.

16. The light bar of claim 14, wherein when the ignition is OFF and the light source switch is closed-circuited and the solar panel is generating electricity, then the light source is energized by the solar panel and the auxiliary battery.

17. The light bar of claim 14, wherein when the vehicle ignition is ON and the light source switch is open and the solar panel is generating electricity, then the auxiliary battery is charged by the solar panel and the vehicle charging system.

18. The light bar of claim 14, wherein when the ignition is OFF and the light source switch is open and the solar panel is generating electricity, then the auxiliary battery is charged by the solar panel.

19. The light bar of claim 14, wherein when the ignition is ON and the light source switch is closed-circuited and the solar panel is not generating electricity, then the light source is energized by the vehicle charging system and the auxiliary battery is charged by the vehicle charging system.

20. The light bar of claim 14, wherein when the vehicle ignition is OFF and the light source switch is closed-circuited and the solar panel is not generating electricity, then the light source is energized by the auxiliary battery.

21. The light bar of claim 14, wherein when the vehicle ignition is ON and the light source switch is open and the solar panel is not generating electricity, then the auxiliary battery is charged by the vehicle charging system.

22. A kit for use with an auxiliary battery and a light bar including a light source, said kit comprising:

a bus adapted to be electrically connected to the auxiliary battery for receiving power from the auxiliary battery and providing power to the auxiliary battery;

a solar panel adapted to be electrically connected to the bus connected to the auxiliary battery, said solar panel for generating electricity and for providing generated electricity to the bus;

a battery isolator adapted to be connected between the bus and a charging system of a vehicle for isolating a vehicle battery from the bus, said battery isolator responsive to the ignition for selectively connecting the bus to the charging system such that the charging system when operating supplies electricity to the bus;

a light source switch adapted to be connected to the light source and to the bus, said light source switch responsive to an operator for selectively electrically connecting the light source to the bus;

wherein when the light source switch is closed-circuited, the light source is energized by electricity from at least one of the solar panel, the charging system and the auxiliary battery;

wherein when the light source switch is open, the light source is isolated from the bus; and wherein the auxiliary battery is adapted to be selectively charged by electricity from at least one of the solar panel and the charging system.

* * * * *